United States Patent
Peloso et al.

(10) Patent No.: US 9,042,725 B2
(45) Date of Patent: May 26, 2015

(54) METHOD AND EQUIPMENT FOR ADJUSTING POWER AMPLIFICATION

(75) Inventors: Pierre Peloso, Nozay (FR); Eric Fabre, Rennes (FR); Pascal Pecci, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 136 days.

(21) Appl. No.: 13/320,660

(22) PCT Filed: May 6, 2010

(86) PCT No.: PCT/EP2010/056158
§ 371 (c)(1), (2), (4) Date: Jan. 11, 2012

(87) PCT Pub. No.: WO2010/139523
PCT Pub. Date: Dec. 9, 2010

(65) Prior Publication Data
US 2012/0106959 A1    May 3, 2012

(30) Foreign Application Priority Data
Jun. 2, 2009   (EP) ..................................... 09290409

(51) Int. Cl.
*H04B 10/293* (2013.01)
*H04B 10/27* (2013.01)
*H04B 10/296* (2013.01)
*H04J 14/02* (2006.01)

(52) U.S. Cl.
CPC ............ *H04B 10/2931* (2013.01); *H04B 10/27* (2013.01); *H04B 10/296* (2013.01); *H04J 14/0221* (2013.01)

(58) Field of Classification Search
None
See application file for complete search history.

(56) References Cited

U.S. PATENT DOCUMENTS 7,242,863 B2 *   7/2007   DeGrange, Jr. ................. 398/30
(Continued)

FOREIGN PATENT DOCUMENTS

| WO | 2006/008321 | 1/2006 |
| WO | 2009/059635 | 5/2009 |

OTHER PUBLICATIONS

Matera, F et al; Investigation on the Implementation of High Capacity Optically Amplified Systems in Links up to 4000 km Long; Optics Communications, North-Holland Publishing Co. Amsterdam, NJ; vol. 119, No. 3; Sep. 1, 1995; pp. 289-295; XP004062442; ISSN: 0030-4018.

*Primary Examiner* — Ken Vanderpuye
*Assistant Examiner* — Merlin Brito Peguero
(74) *Attorney, Agent, or Firm* — Patti & Malvone Law Group LLC (57) ABSTRACT

The present invention refers to a method for adjusting power levels of channels (15) in an optical link (7) of an optical network comprising at least one optical amplifier (9) wherein the power distribution among the channels (15) of the optical link (7) is achieved in function of:
 target power levels based on the features of corresponding connections and of link physical features,
 total available power in said at least one amplifier (9),
 features of control means allowing the power distribution,
and wherein for a channel corresponding to a connection having a higher vulnerability characterizing parameter, the tolerated difference between an actual channel power level and the target power level is lower than for a channel corresponding to a connection having a lower vulnerability characterizing parameter.

17 Claims, 6 Drawing Sheets

(56) References Cited

U.S. PATENT DOCUMENTS

| | | | |
|---|---|---|---|
| 2002/0109881 A1* | 8/2002 | Yang | 359/134 |
| 2005/0210353 A1* | 9/2005 | Dohmen et al. | 714/746 |
| 2007/0014571 A1* | 1/2007 | Roberts et al. | 398/25 |
| 2007/0201878 A1* | 8/2007 | Nakashima et al. | 398/177 |
| 2008/0239469 A1* | 10/2008 | Onaka et al. | 359/337 |

* cited by examiner

METHOD AND EQUIPMENT FOR ADJUSTING POWER AMPLIFICATION

BACKGROUND OF THE INVENTION

The present invention relates to the field of communication networks and in particular to optical communication networks.

Figure 1:
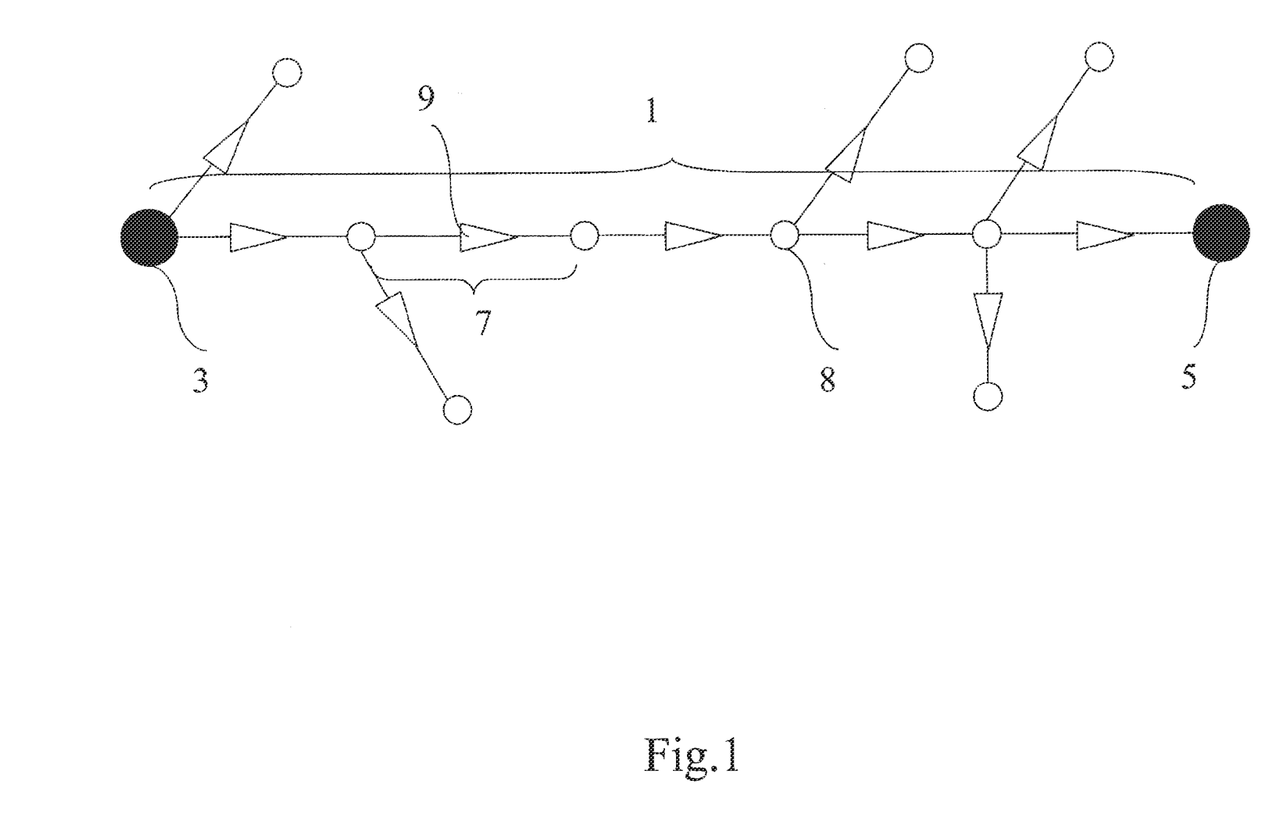
FIG. 1 shows a schematically illustration of a connection in an optical network.
Figure 2:
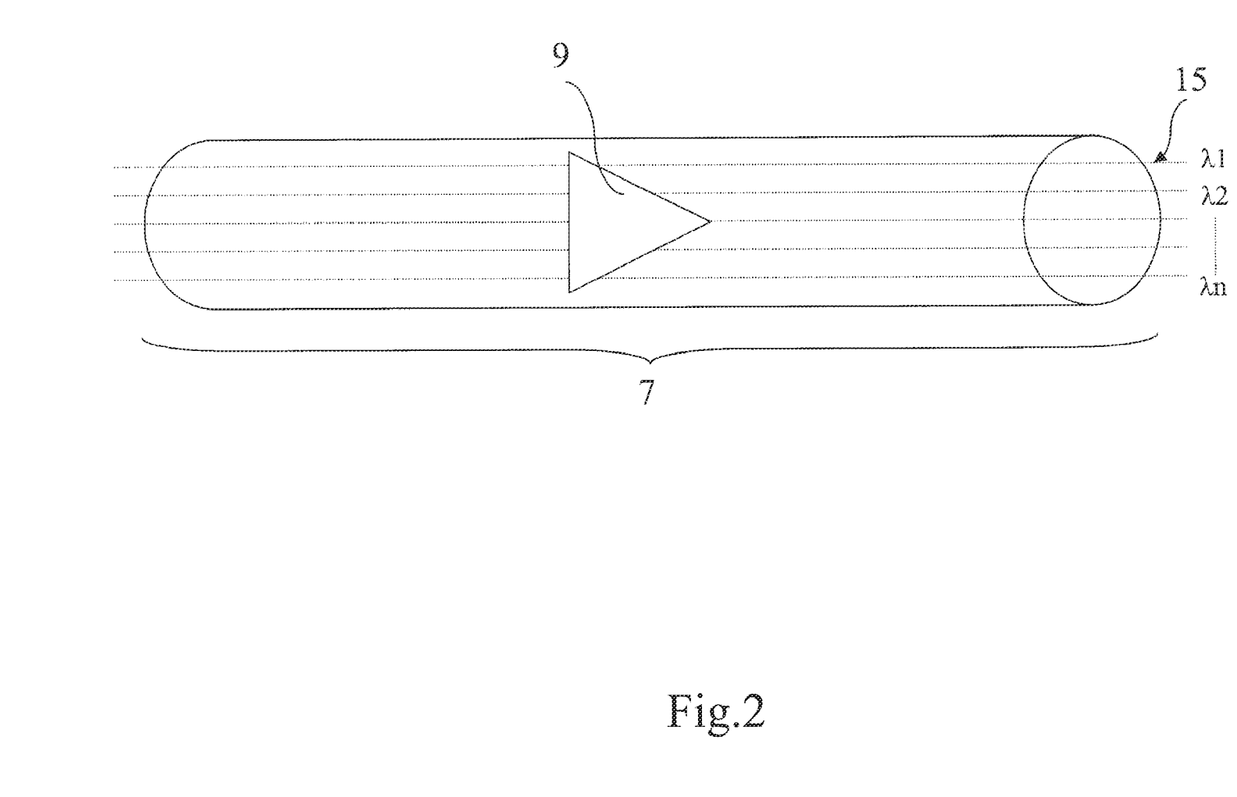
FIG. 2 shows a schematically illustration of an optical link.

In such networks, signals are transmitted along a connection 1 on a given channel from an ingress node 3 to an egress node 5 through a plurality of links 7 and switching nodes 8, each link comprising at least one amplifier 9 as shown schematically in FIG. 1. Moreover, in a link, a plurality of channels 15 are transmitted and amplified together, each channel 15 corresponding to one wavelength as presented schematically in FIG. 2.

The amplification power in the links has to be adjusted in order to optimize, for the connections involved in the link, the signal quality at destination. In the state of the art, equalization is achieved on the different channels such that all the channels of a link receive the same amount of power.

Nevertheless, the known way to adjust power levels is not optimized.

SUMMARY OF THE INVENTION

It is therefore an object of the present invention to improve power adjustment with regard to the state of the art and provide a method for optimizing the adjustment of power levels of the channels in an optical link.

Thus, the present invention refers to a method for adjusting power levels of channels in an optical link of an optical network comprising at least one optical amplifier wherein the power distribution among the channels of the optical link is achieved in function of:
 target power levels based on the features of corresponding connections and of link physical features,
 total available power in said at least one amplifier,
 features of control means allowing the power distribution, and wherein for a channel corresponding to a connection having a higher vulnerability characterizing parameter, the tolerated difference between an actual channel power level and the target power level is lower than for a channel corresponding to a connection having a lower vulnerability characterizing parameter.

According to one embodiment, the adjustment is realized in a way that the power distribution among the channels of the optical link tends to minimize the tolerated difference between an actual channel power level and the target power level of the channels corresponding to connections having a higher vulnerability characterizing parameter.

According to a further aspect, the vulnerability characterizing parameter comprises a length parameter of the corresponding connection such that longer connections have a higher vulnerability characterizing parameter.

According to an additional aspect, the vulnerability characterizing parameter comprises a bitrate parameter of the corresponding connection such that connections having higher bitrates have a higher vulnerability characterizing parameter.

According to another aspect, the vulnerability characterizing parameter comprises a format parameter of the error correction code of the corresponding connection such that the vulnerability characterizing parameter varies in function of the format of the error correction code of the connection.

According to a further aspect, the vulnerability characterizing parameter comprises a modulation format parameter of the corresponding connection such that the vulnerability characterizing parameter varies in function of the modulation format of the connection.

According to an additional aspect, the adjustment of the power levels comprises the minimization of a cost function taking into account the target power levels of said channels and the vulnerability characterizing parameter of the connections corresponding to said channels, said cost function being subject to a total available power condition.

According to another embodiment, the cost function to minimize corresponds to the function f (P) such that $$f(P) = \sum_{i=1}^{L} \frac{(P_i - m_i)^2}{(\sigma_i)^2}$$

where i is the channel index, L the number of channels, $P_i$ is the actual power level in the channel i, $m_i$ the target power level for the channel i (both powers being expressed in a logarithmic scale) and $1/(\sigma_i)^2$ is the vulnerability characterizing parameter of the connection corresponding to the channel i and is subject to the total available power condition $$\sum_{i=1}^{L} e^{aP_i} \leq C$$

where C is the total available power expressed in linear scale and a is a constant.

According to a further aspect, the cost function is also subject to a limited range condition for the adjustment of the power of the channels:

$$\beta_i^{minus} \leq P_i \leq \beta_i^{plus}$$

where $\beta_i^{plus}$ and $\beta_i^{minus}$ are respectively the upper and lower threshold of the power range of the channel i.

According to an additional aspect, the adjustment of the power levels of said channels is achieved by a converging iterative method.

According to another aspect, the actual power values change in function of the state of other links of the corresponding connections.

According to a further aspect, a modification of the actual power value is used for compensating lack or excess of power in other links of the corresponding connection.

The present invention also refers to an optical link comprising:
 at least one optical amplifier,
 reception means for receiving information about the connections corresponding to the channels,
 processing means adapted to determine channels power levels in said optical link in function of:
  target power levels based on the features of the corresponding connections and of link physical features,
  the total available power in said at least one amplifier,
  the features of control means allowing power distribution,
 and according to the fact that for a channel corresponding to a connection having a higher vulnerability characterizing parameter, the tolerated difference between an actual channel power level and the target power level is lower than for a channel corresponding to a connection having a lower vulnerability characterizing parameter, and control means for adjusting the power levels according to the power levels values determined by the processing means.

According to another aspect, the processing means are adapted to perform an adjustment of the power levels comprising the minimization of a cost function taking into account the target power levels and the vulnerability characterizing parameter of the connections corresponding to the channels, said cost function being subject to a total available power condition.

According to a further embodiment, the processing means are adapted to perform a minimization of a cost function corresponding to the function f (P) such that $$f(P) = \sum_{i=1}^{L} \frac{(P_i - m_i)^2}{(\sigma_i)^2}$$

where i is the channel index, L the number of channels, $P_i$ is the power level in the channel i, $m_i$ the target power level for the channel i (both powers being expressed in a logarithmic scale) and $1/(\sigma_i)^2$ is the vulnerability characterizing parameter of the connection corresponding to the channel i, said cost function being subjected to the total available power condition $$\sum_{i=1}^{L} e^{aP_i} \leq C$$

where C is the total available power expressed in linear scale.

According to an additional aspect, the processing means are also adapted to minimize said cost function f(p) while taking into account a limited range condition for the adjustment of the channels power levels:

$$\beta_i^{minus} \leq P_i \leq \beta_i^{plus}$$

where $\beta_i^{plus}$ and $\beta_i^{minus}$ are respectively the upper and lower threshold of the power range of the channel i.

According to another aspect, the processing means are adapted to perform an adjustment in the determination of said channels power levels based on a converging iterative method.

DETAILED DESCRIPTION OF THE INVENTION

As used herein, the term "vulnerability characterizing parameter" of a connection refers to the lack of robustness of the connection with respect to degradation or impairments undergone by the signal along the connection. Different parameters may influence said vulnerability characterizing parameter such as the length of the connection,
the modulation format along the connection,
the bitrate of the connection,
the format of the error correction code along the connection,
the physical features of a link such as the type of optical fibers for example.

An idea of the embodiments of the present invention is to adjust individually the power levels of the different channels 15 of a link 7 in function of the features of the corresponding connections 1.

The adjustment is achieved by the determination, for each channel of the link, of a target power level corresponding to the power level producing the lowest signal degradation on the concerned channel.

The degradation is estimated in function of the physical features of the links 7 from the concerned power level adjustment to the next power level adjustment along the connection 1 corresponding to the concerned channel.

Figure 3:
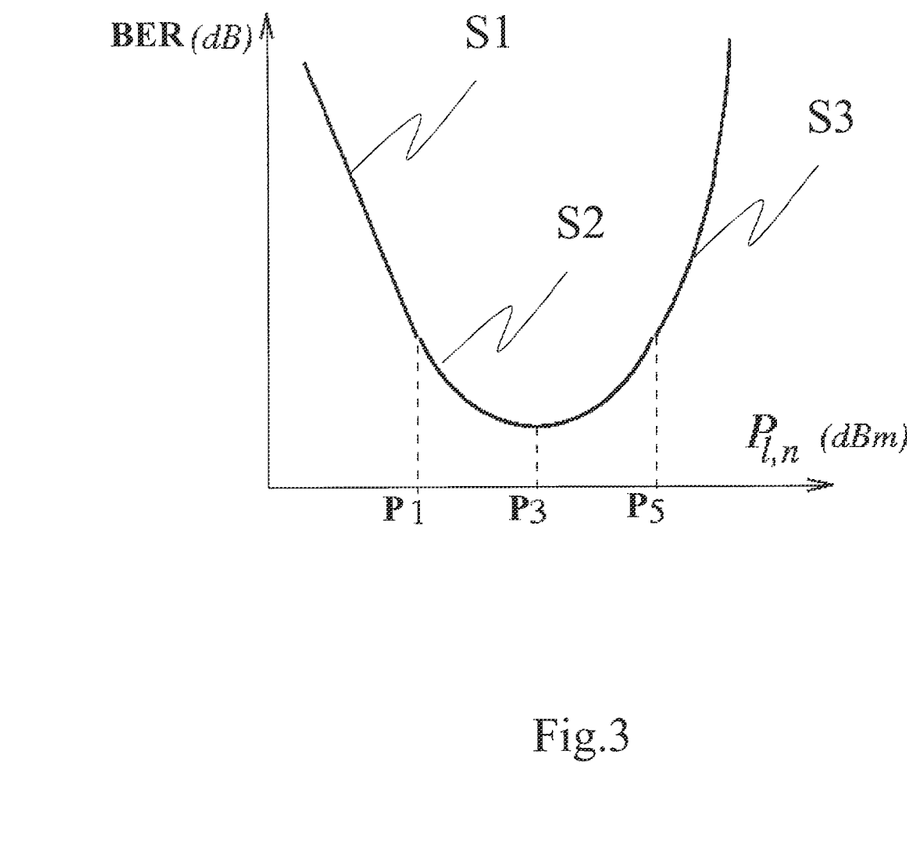
FIG. 3 shows a graph representing the bite error rate at the output of a link in function of the input power.

Indeed, FIG. 3 shows a curve that is a representation of the bit error rate (BER) in function of the power level ($P_{l,n}$) on a channel 15 of an optical link 7, both the BER and the power level being represented in decibels (dB). In this curve, we can distinguish three segments.

First, there is a linear segment S1. When the power level is too low, that is lower than P1, noise produces impairments and the bit error rate grows linearly with a decrease of power level.

The second segment S2 between power levels P1 and P2 has a parabolic form. This segment S2 is a segment where the error bit rate stays within acceptable limits.

It can be noted that the bit error rate has a minimum value at a power value P3 corresponding to the target power level.

The third segment S3 from power level P3 increases exponentially with increasing power level. This is due to the fact that when the power level is too high, optical non-linear effects produce impairments in the signal leading to a degradation of the signal and therefore to an increase of the bit error rate.

The general shape of the curve with the linear S1, parabolic S2 and exponential S3 segments is the same for all channels and links. However, the total value of the bit error rate, in particular the minimum BER at P3 and the width of segment S2 varies in function of the above cited parameters that influence degradation.

One may also recognize that for example a channel in a link having a wider S2 segment may be less affected by impairments than a channel having a sharp defined S2 segment. This means that in the first case, there are more latitudes to adjust the power level without risking impairments than in a second one.

Thus, in the ideal case, all the channels 15 should be set to their target power level in order to obtain the best signal quality at destination. This would also mean to reach an optimal transparency of the optical network because optimal connections with the lowest need of regeneration may be achieved.

However, additional constraints may prevent such adjustment. Indeed, the total power available in a link is limited and the power distribution means of a link 7 have also technical limits such that a trade-off is generally needed.

The actual power levels set for each channel may differ from the target power level depending on the technical constraints. Furthermore, some connections may suffer more from a modification of the power level than others.

Indeed, for a connection 1 having a low vulnerability characterizing parameter, a modification of the power level in a link of the connection will have a lower impact than for a connection 1 having a higher degradation parameter.

According to an aspect of the present invention, for the channels 15 corresponding to connections 1 having high degradation parameter, the acceptable range of variation of the power level is reduced with respect to channels having low degradation parameter.

For example, for two channels 15 of a link 7, one with a high vulnerability characterizing parameter and one with a low vulnerability characterizing parameter, an adjustment range of only 1 dB will be tolerated on the channel 15 having a high vulnerability characterizing parameter whereas an adjustment range of 5 dB will be tolerated on the channel 7 having a low vulnerability characterizing parameter.

The vulnerability characterizing parameter depends on features of the connection 1 and features of the links 7 crossed along the connection 1 that produce degradation or impairments of the signal along the connection 1. For example, a longer connection 1 will potentially undergo more degradations than a shorter connection 1.

It has to be noted that the length of the connection 1 may refer to its physical length (for example in km) but also to a number of links 7 or spans along the connection 1 or a combination of the number of links 7 or spans and their physical lengths. The modulation format, the bitrate and the format of the error code may also influence the quantity of degradations acceptable for the signal along the connection 1 and may therefore be taken into account in the vulnerability characterizing parameter.

Thus, the vulnerability characterizing parameter allows to take into account the vulnerability of the corresponding connection 1 in the adjustment of the power levels of the different channels of the link and to favour channels 15 corresponding to the more "vulnerable" connections 1, that is to say, the ones for which the signal at destination is potentially the more degraded.

In order to optimize the trade-off in the adjustment of the power levels of the different channels 15 transmitted in a link 7, an embodiment of the present invention refers to the minimization of a cost function taking into account the different constraints for the different channels 15.

The cost function can be described by the function $$f(P) = \sum_{i=1}^{L} \frac{(P_i - m_i)^2}{(\sigma_i)^2}$$

where i is the channel index, L the number of channels, $P_i$ is the actual power level in the channel i, $m_i$ the target power level for the channel i, both powers being expressed in a logarithmic scale and $1/(\sigma_i)^2$ is the vulnerability characterizing parameter of the connection corresponding to the channel i.

Said cost function being subject to a total available power condition $$\sum_{i=1}^{L} e^{aP_i} \leq C$$

where C is the total available power in the link expressed in linear scale and a is a constant.

Moreover, the cost function is also subject to a limited range condition for the adjustment of the power of the channels:

$$\beta_i^{minus} \leq P_i \leq \beta_i^{plus}$$

where $\beta_i^{plus}$ and $\beta_i^{minus}$ are respectively the upper and lower threshold of the power range of the channel i.

To achieve the minimization of said cost function, a solution is the determination of the stationary points of the corresponding Lagrangian:

$$L(P, \lambda, \mu, \nu) = \sum_{i=1}^{L} \frac{(P_i - m_i)^2}{(\sigma_i)^2} + \nu \left( \sum_{i=1}^{L} e^{aP_i} - C \right) + \lambda'(P - \beta^{plus}) + \mu'(\beta^{moins} - P)$$

where $\lambda$, $\mu$ and $\nu$ are variables.

The stationary points of the Lagrangian are given by the equation:

$$\frac{\partial L(P, \lambda, \mu, \nu)}{\partial P_i} = 2\frac{(P_i - m_i)}{(\sigma_i)^2} + \nu a e^{aP_i} + (\lambda_i - \mu_i) = 0$$

$$\text{with } \nu \geq 0 \text{ and } \nu \left( \sum_{i=1}^{L} e^{aP_i} - C \right) = 0$$

The problem is that it corresponds to a set of nonlinear equations.

Figure 4:
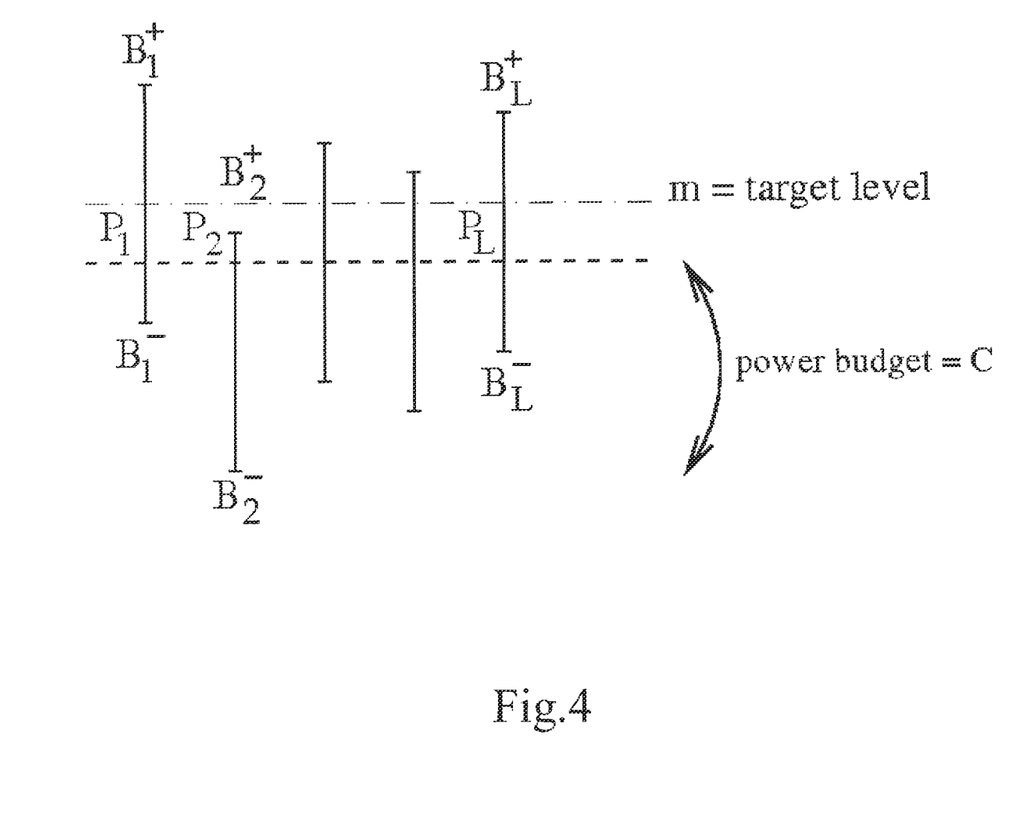
FIG. 4 is a schematic diagram illustrating a "water filling" solution.

If all the connections are identical: $m_i = m$ and $\sigma_i = \sigma$ assuming that all the $P_i$ are inside their bounds ($\lambda_i = \mu_i = 0$) then the equation is the same for all $P_i$:

$$2\frac{(P_i - m)}{(\sigma)^2} + \nu a e^{aP_i} = 0$$

the solution corresponds to the solution known in mathematics as the classical "water-filling" problem shown in FIG. 4 where the B+ and B− correspond to the range bounds of the power level for the different channels. (Concerning "water filling problems" in general and its solutions one may refer to an article "Closed form solutions for water-filling problems in optimization and game frameworks" by Eitan Altman et al. on Game Comm 2007, Oct. 22, 2007, Nantes, France.)

Figure 5:
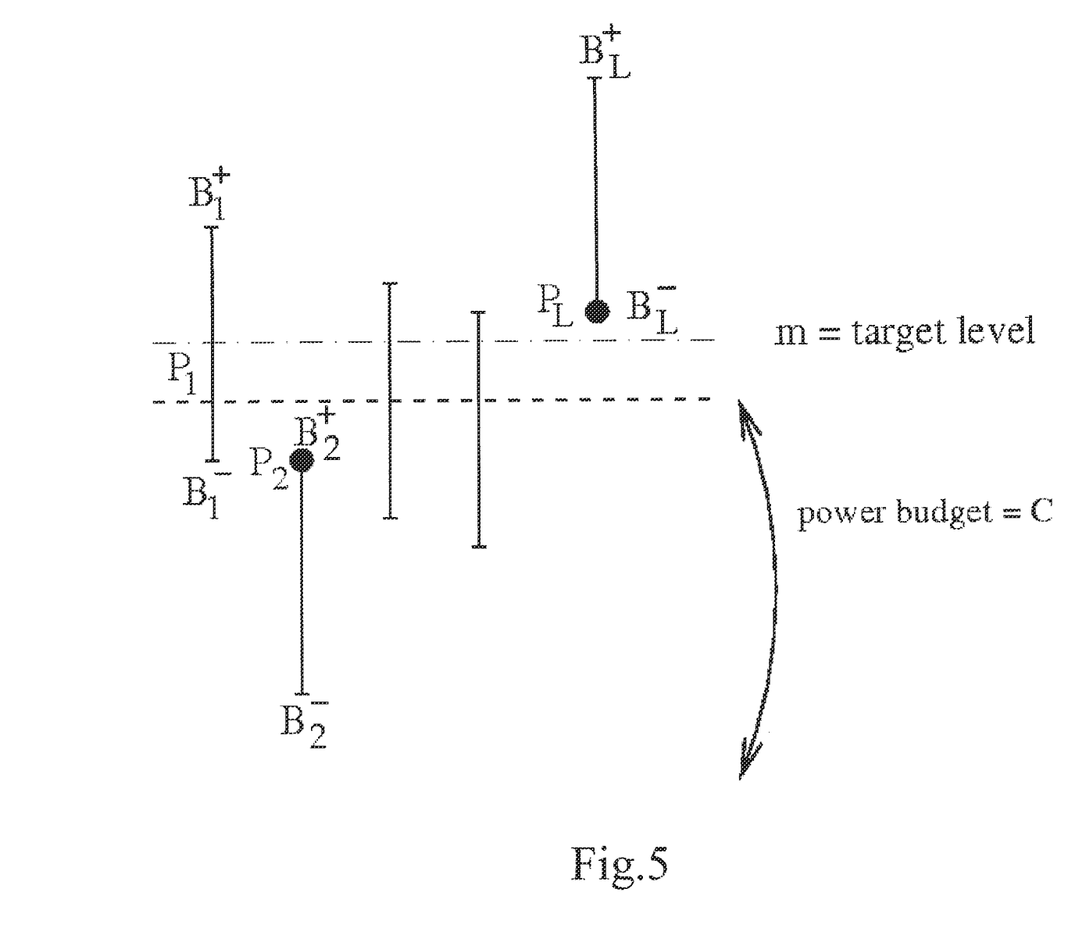
FIG. 5 is a schematic diagram illustrating a "water filling" solution with siphons.

In FIG. 4, the upper horizontal dotted line represents the target level which is not reachable due to a lack of power in the link and the lower horizontal dotted line represents the available power budget C and corresponds to the power level which is reachable for the channels. Thus, the power levels are set to this level. In the case of channels reaching their bounds, the problem remains as a water filling problem with siphons as described in FIG. 5.

If the target power levels and the vulnerability characterizing parameters are different and assuming that all the $P_i$ are inside their bounds ($\lambda_i = \mu_i = 0$), the nonlinear system to solve is $$\frac{\partial L(P, \lambda, \mu, v)}{\partial P_i} = 2\frac{(P_i - m_i)}{(\sigma_i)^2} + vae^{aP_i} = 0$$

$$\text{with} \left(\sum_{k=1}^{L} e^{aP_{ki}}\right) - C = 0$$

where k is a channel index

Thus, v can be eliminated:

$$\sum_{i=1} 2\frac{(P_i - m_i)}{(\sigma_i)^2} + vaC = 0 \text{ then}$$

$$\frac{(P_i - m_i)}{(\sigma_i)^2} = \left(\frac{1}{C}\right)Se^{aP_i} \text{ with } S = \sum_{k=1} \frac{(P_k - m_k)}{(\sigma_k)^2}$$

for S fixed, one can solve for each $P_i$ (secant method) then S is updated and the method is iterated. Moreover, said method is converging toward an optimal solution.

Thus, according to an embodiment of the present invention, the adjustment of the power levels of the channels is achieved by a converging iterative method Moreover, the method is dynamic in order to take into account any modifications occurring in the link such as the addition or the suppression of a connection in the link.

Besides, the adjustment of the power levels of the channels 15 in a link 7 may be influenced by the adjustment of said power levels in other links. Indeed, if in a link 7 of a connection 1 (FIG. 1), the actual power level is out of the tolerated range due to technical limitations, a compensation can be achieved in the other links 7 of the connection 1. Thus, an actual power level of a channel 15 can be modified to compensate for a lack or an excess of power in another link 7 of the corresponding connection 1.

Figure 6:
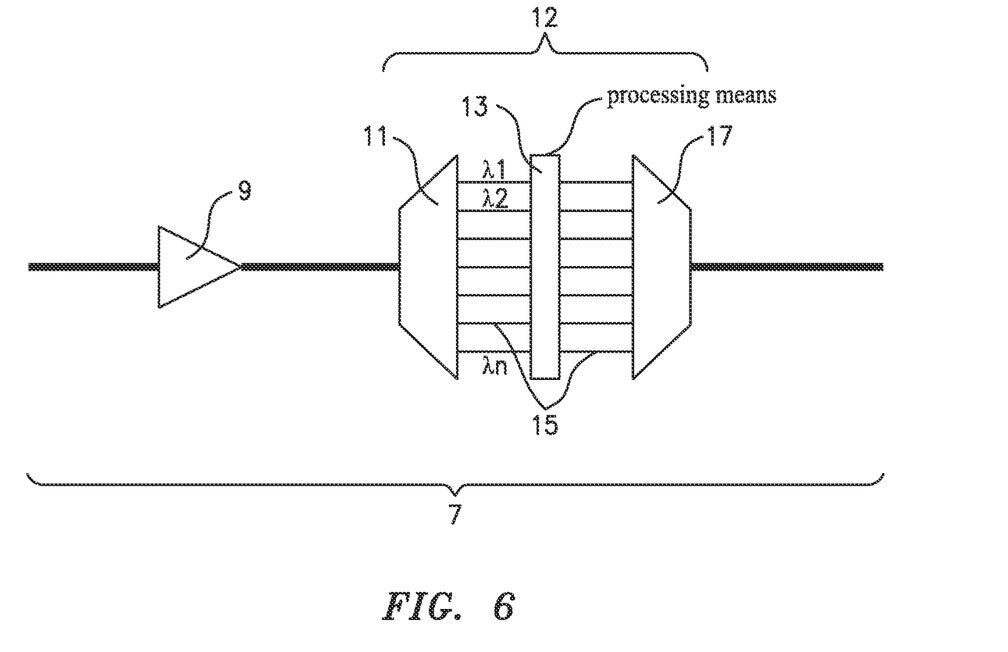
FIG. 6 is a diagram of the power distribution means of an optical link.

In practice, an optical link 7 comprises at least one optical amplifier 9 and control means allowing the set the power level of each individual channel. Indeed, a link 7 may comprises several spans comprising each an optical amplifier 9 such that the link 7 comprises several optical amplifiers 9. As described in FIG. 6, the control means may be any individual wavelength attenuation system 12 such as a wavelength selective switch (WSS) or a wavelength blocker (WB), said system 12 often comprise, a demultiplexing system 11, a range of optical attenuators 13 (for example a set of variable optical attenuators (VOAs)) allowing to set individual attenuations to the different channels 15 and a multiplexing system 17. Indeed, the different channels 15 are multiplexed before being transmitted through a link 7. The demultiplexer 11 therefore allows separating the different channels 15 corresponding to different wavelengths. The power level of each channel 15 is then adjusted. The different channels 15 are finally remultiplexed in the multiplexer 17 in order to be transmitted through the following link 7. In an embodiment, the wavelength attenuation system 12 is integrated within an optical switching node 8.

Moreover, information about the connections 1 corresponding to the different channels 15 of the link 7 are transmitted to the link 7. A reception means receives the information about the connections 1 corresponding to channels 15. Thus, based on this information, the processing means of the link 7 can achieve the computation corresponding to the optimization described above in order to determine the adjustment of the power levels of the different channels 15 allowing taking into account all the constraints. As a consequence, the values determined by the processing means are then applied by the at least one optical amplifier 9 and the control means.

Thus, the embodiments of the present invention allow to adjust individually the power levels of the different channels 15 of a link 7 and to optimize said adjustment such that the adjustment range of channels 15 corresponding to connections having high vulnerability characterizing parameters is reduced with respect to channels 15 corresponding to connections 1 having low vulnerability characterizing parameters. The application of such adjustment in an optical network contributes to a better power distribution and therefore to an optimization of the ratio of the signal quality at the egress node 5 over the requested amount of power.

In addition, the embodiments of the present invention allow to lower regeneration needs and to increase transparency of the network.

The invention claimed is:

1. A method for adjusting power levels of channels in an optical link of an optical network, comprising:
    receiving information about connections corresponding to the channels of the optical link; and
    determining a power distribution among the channels of the optical link as a function of:
        target power levels based on features of corresponding connections and of link physical features, wherein the target power levels correspond to power levels that produce a lowest signal degradation on the channels;
        a total available power in at least one optical amplifier; and
        features of a control means that allows the power distribution;
    wherein the adjustment of the power levels comprises a minimization of a cost function that takes into account the target power levels of the channels and a vulnerability characterizing parameter of the connections that correspond to the channels, the cost function being subject to a total available power condition.

2. The method in accordance with claim 1, wherein the power distribution among the channels of the optical link minimizes a tolerated difference between an actual channel power level and the target power level of the channels that correspond to connections having a higher vulnerability characterizing parameter.

3. The method in accordance with claim 1, wherein longer connections have a higher vulnerability characterizing parameter.

4. The method in accordance with claim 1, wherein connections that have higher bit rates have a higher vulnerability characterizing parameter.

5. The method in accordance with claim 1, wherein the vulnerability characterizing parameter varies as a function of a format of an error correction code of along a connection.

6. The method in accordance with claim 1, wherein the vulnerability characterizing parameter varies as a function of a modulation format of a connection.

7. The method in accordance with claim 1, wherein the cost function to minimize corresponds to a function f (P) such that $$f(P) = \sum_{i=1}^{L} \frac{(P_i - m_i)^2}{(\sigma_i)^2}$$

where i is a channel index, L is a number of channels, $P_i$ is an actual power level in the channel i, $m_i$ is the target power level for the channel i and $1/(\sigma_i)^2$ is the vulnerability characterizing parameter of the connection that corresponds to the channel i and is subject to the total available power condition $$\sum_{i=1}^{L} e^{aP_i} \leq C$$

where C is the total available power and a is a constant.

8. The method in accordance with claim 7, wherein the cost function is also subject to a limited range condition for the adjustment of the power levels of the channels:

$\beta_i^{minus} \leq P_i \leq \beta_i^{plus}$ where $\beta_i^{plus}$ and $\beta_i^{minus}$ are respectively an upper and lower threshold of the power range of the channel i.

9. The method in accordance with claim 1, further comprising achieving the adjustment of the power levels of the channels by a converging iterative method.

10. The method in accordance with claim 1, further comprising changing actual power values as a function of a state of other links of the corresponding connections.

11. The method in accordance with claim 10, wherein a modification of the actual power values is used for compensating lack or excess of power in the other links of the corresponding connection.

12. The optical link in accordance with claim 1, wherein control power levels of the channels in the optical link are adjusted individually.

13. An optical link comprising:
at least one optical amplifier;
a processing means adapted to determine power levels of the channels in the optical link as a function of:
  target power levels based on features of corresponding connections and of link physical features, wherein the target power levels correspond to power levels that produce a lowest signal degradation on the channels;
  a total available power in the at least one amplifier;
  features of a control means that allows power distribution; and
a control means for adjusting the power levels according to the power levels values determined by the processing means;

wherein the processing means are adapted to perform an adjustment of the power levels comprising a minimization of a cost function that takes into account the target power levels and a vulnerability characterizing parameter of the connections that correspond to the channels, the cost function being subject to a total available power condition.

14. The optical link in accordance with claim 12, wherein the processing means are adapted to perform a minimization of a cost function that corresponds to a function f(P) such that $$f(P) = \sum_{i=1}^{L} \frac{(P_i - m_i)^2}{(\sigma_i)^2}$$

where i is a channel index, L is a number of channels, $P_i$ is an actual power level in the channel i, $m_i$ is the target power level for the channel i and $1/(\sigma_i)^2$ is the vulnerability characterizing parameter of the connection that corresponds to the channel i, the cost function being subjected to the total available power condition $$\sum_{i=1}^{L} e^{aP_i} \leq C$$

where C is the total available power.

15. The optical link in accordance with claim 13, wherein the processing means are also adapted to minimize the cost function f(p) while taking into account a limited range condition for the adjustment of the power levels of the channels:

$\beta_i^{minus} \leq P_i \leq \beta_i^{plus}$ where $\beta_i^{plus}$ and $\beta_i^{minus}$ are respectively an upper and lower threshold of the power range of the channel i.

16. The optical link in accordance with claim 13, wherein the processing means are adapted to perform an adjustment in a determination of the power levels of the channels based on a converging iterative method.

17. The optical link in accordance with claim 12, wherein the control means comprises a wavelength selective switch or a wavelength blocker.

* * * * *